US011131769B2

(12) United States Patent
Mizuno et al.

(10) Patent No.: US 11,131,769 B2
(45) Date of Patent: Sep. 28, 2021

(54) OBJECT DETECTION DEVICE, OBJECT DETECTION METHOD AND VEHICLE CONTROL SYSTEM

(71) Applicants: DENSO CORPORATION, Kariya (JP); TOYOTA JIDOSHA KABUSHIKI KAISHA, Toyota (JP)

(72) Inventors: Ryo Mizuno, Kariya (JP); Yohei Masui, Kariya (JP); Takashi Maeda, Nagoya (JP)

(73) Assignees: DENSO CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 396 days.

(21) Appl. No.: 16/128,927

(22) Filed: Sep. 12, 2018

(65) Prior Publication Data
US 2019/0079181 A1 Mar. 14, 2019

(30) Foreign Application Priority Data
Sep. 14, 2017 (JP) .............................. JP2017-176853

(51) Int. Cl.
*G01S 13/931* (2020.01)
*G06K 9/00* (2006.01)
(Continued)

(52) U.S. Cl.
CPC ........... *G01S 13/931* (2013.01); *B60W 30/16* (2013.01); *B60W 30/162* (2013.01);
(Continued)

(58) Field of Classification Search
CPC . G01S 13/931; G01S 13/867; G01S 2013/932
(Continued)

(56) References Cited

U.S. PATENT DOCUMENTS

2003/0090409 A1   5/2003   Tokutsu et al.
2008/0266169 A1  10/2008   Akita
2015/0025768 A1*  1/2015   Goto ..................... B60W 30/18
                                                                701/70

FOREIGN PATENT DOCUMENTS

JP    2003-149337 A    5/2003
JP    2004-82912 A     3/2004
(Continued)

*Primary Examiner* — Bo Fan
(74) *Attorney, Agent, or Firm* — Maschoff Brennan

(57) ABSTRACT

An ECU as an object detection device and a radar device are mounted on a vehicle. The radar device acquires front-view images containing a detection-target object such as a preceding vehicle present within a predetermined area around the vehicle. The radar device recognizes the detection-target object in time series based on the acquired front-view images. The ECU realizes a preceding vehicle selection part, an irregular-detection detecting part and an association processing part. The selection part selects the object when a relationship between the object and the vehicle satisfies a predetermined condition. The detecting part detects occurrence of an irregular detection when a first object selected as the preceding vehicle and a second object not selected as the preceding vehicle are detected based on the object. The association processing part performs an association process of associating history of the first object to the second object when the irregular detection has occurred.

13 Claims, 7 Drawing Sheets

(51) Int. Cl.
*B60W 30/16* (2020.01)
*B60W 50/029* (2012.01)
*G01S 13/86* (2006.01)

(52) U.S. Cl.
CPC ......... *B60W 50/029* (2013.01); *G01S 13/867* (2013.01); *G06K 9/00805* (2013.01); *B60W 2720/106* (2013.01); *G01S 2013/932* (2020.01); *G01S 2013/9322* (2020.01); *G01S 2013/9324* (2020.01); *G01S 2013/9325* (2013.01)

(58) Field of Classification Search
USPC .......................................... 342/70, 105, 436
See application file for complete search history.

(56) References Cited

FOREIGN PATENT DOCUMENTS

| | | |
|---|---|---|
| JP | 2005-121496 A | 5/2005 |
| JP | 2007-232411 A | 9/2007 |
| JP | 2008-275460 A | 11/2008 |
| WO | 2013/136495 A1 | 9/2013 |

* cited by examiner

OBJECT DETECTION DEVICE, OBJECT DETECTION METHOD AND VEHICLE CONTROL SYSTEM

CROSS-REFERENCE TO RELATED APPLICATION

This application is related to and claims priority from Japanese Patent Application No. 2017-176853 filed on Sep. 14, 2017, the contents of which are hereby incorporated by reference.

BACKGROUND OF THE INVENTION

1. Field of the Invention

The present invention relates to object detection devices and object detection methods capable of detecting objects around an own vehicle, and relates to vehicle control systems capable of performing drive control of the own vehicle on the basis of detection results of an object detection device.

2. Description of the Related Art

An object detection device is a known device using a radar device, for example PCT internal publication No. 2013-136495 discloses a radar detection device capable of detecting objects around an own vehicle on the basis of object data acquired by a radar device mounted on the own vehicle. The object detection device receives radar waves which have been transmitted from the radar device and reflected by an object located in front of the own vehicle. The received radar waves correspond to radar reflection points on the object located in front of the own vehicle. The object detection device selects radar reflection points which satisfy a predetermined condition and obtains a radar detection object composed of the selected radar reflection points.

When a radar detection object composed of previously-selected radar reflection points belongs to the radar detection object composed of currently-selected radar reflection points, data regarding these radar detection objects associated with each other are stored in a memory device. Accordingly, it is possible for the object detection device to detect the object in time series on the basis of history data of the radar detection objects, and for a vehicle control device to avoid a collision of the own vehicle with the detected object. Further, it is possible for the vehicle control device to perform a vehicle distance control on the basis of history data of the radar detection objects. The vehicle distance control can keep a distance of the own vehicle with the detected object such as a preceding vehicle.

On the other hand, in general, because radar reflection points on the radar detection object easily vary, a plurality of radar reflection points obtained from a same object are divided into a plurality of groups. When the plurality of radar reflection points obtained from the same object are divided into a plurality of groups, a plurality of radar detection objects are detected on the basis of the plurality of reflection points obtained from the same object. This phenomenon will be referred with the "irregular detection". In the irregular detection, there is a possible case in which it becomes difficult for the object detection device to continuously and correctly select the same object as a preceding vehicle.

However, the patent document according to a related art previously described does not consider this problem. It is accordingly necessary to correctly and continuously recognize an object as a preceding vehicle which is present in front of the own vehicle even if the irregular detection occurs in the object which has been selected as the preceding vehicle.

SUMMARY

It is therefore desired to provide an object detection device, an object detection method and a vehicle control system capable of correctly and continuously detecting a same object as a preceding object which is present in front of an own vehicle even if an irregular detection occurs in the same object.

In accordance with an aspect of the present invention, there is to provided an exemplary embodiment which provides an object detection device which is mounted on an own vehicle. The own vehicle is equipped with a radar device. The radar device has a radar detection object acquiring part and an object recognition part. The radar detection object acquiring part acquires, as a radar detection object, an object which is present within a predetermined area around the own vehicle. The object recognition part recognizes the object in time series on the basis of the radar detection object acquired by the radar detection object acquiring part.

The object detection device has a computer system including a central processing unit. The computer system is configured to provide a preceding vehicle selection part, an irregular-detection detecting part and an association processing part. The preceding vehicle selection part selects the object as a preceding vehicle which is running in front of the own vehicle when the object recognition part recognizes, as the preceding vehicle, the object when a relationship between the object and the own vehicle satisfies a predetermined condition. The irregular-detection detecting part detects occurrence of an irregular detection of the object selected as the preceding vehicle. In the irregular detection, a first object and a second object are acquired. The first object is used for selecting the object as the preceding vehicle. On the other hand, the second object has not been used for selecting the object as the preceding vehicle. The association processing part performs an association process which associates history data of the first object with the second object when the irregular detection has occurred. For example, in the association process which is performed when the irregular detection previously described has occurred and been detected, the association processing part uses, i.e. determines an initial value of an own vehicle driving line probability of the second object on the basis of, i.e. by using history data of an own vehicle driving line probability of the first object.

The object detection device according to an exemplary embodiment of the present invention has the improved structure previously described. When the irregular detection occurs in the detection target object selected as the preceding vehicle, the object detection device performs the association process of associating the history data of the first object with the second object. In the irregular detection, both the first object and the second object are detected from the detection target object selected as the preceding vehicle, and the first object has been used in the selection of the object and the second object has not been used. Even if the irregular detection has occurred, the object detection device according to the present invention performs the association process. For example, in the association process performed when the irregular detection has occurred, the association processing part determines an initial value of the own vehicle driving line probability of the second object on the basis of, i.e. by using history data of the own vehicle driving line probability of the first object.

The association process makes it possible to continuously and correctly select the same detection target object as the preceding vehicle on the basis of the second object associated with the history data of the first object without missing the same detection target object as the preceding vehicle.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
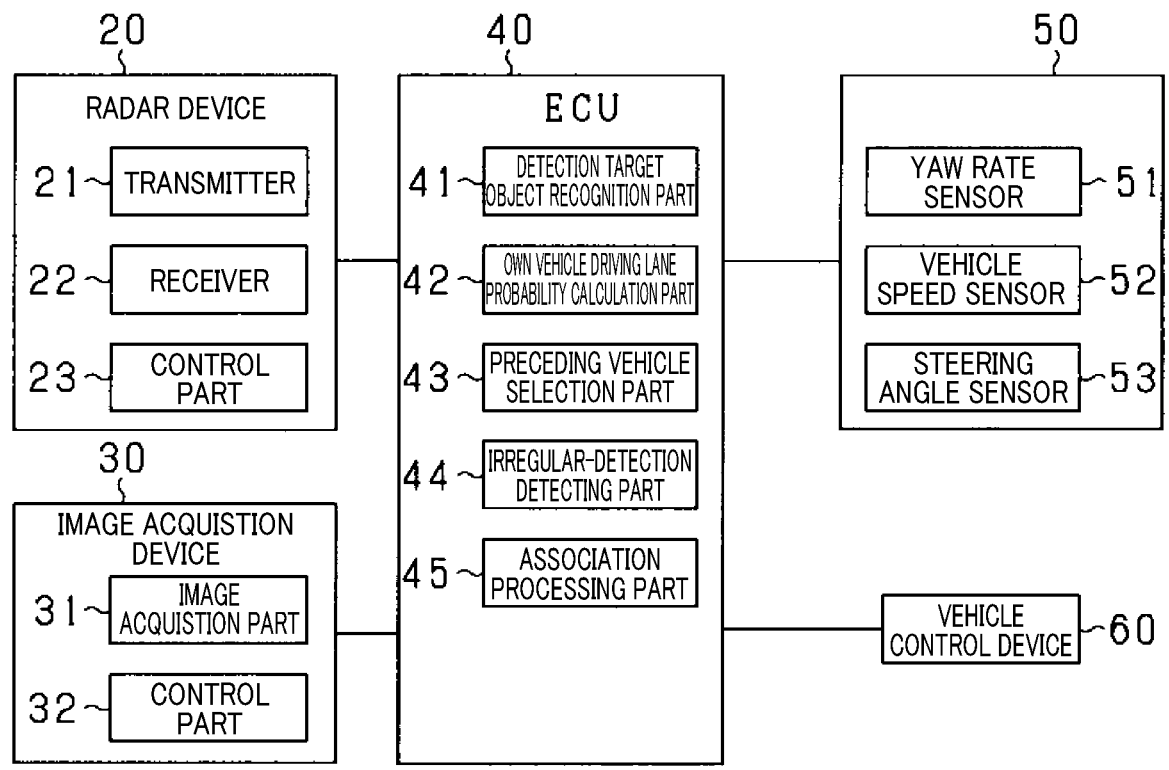
FIG. 1 is a schematic view showing a block diagram of an object detection device and a vehicle control system according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of an object detection device, an object detection method and a vehicle control system according to an exemplary embodiment of the present invention with reference to FIG. 1 to FIG. 10.

FIG. 1 is a schematic view showing a block diagram of the object detection device and the vehicle control system according to the exemplary embodiment.

The vehicle control system according to the exemplary embodiment is mounted on an own vehicle. The vehicle control system has the object detection device and the vehicle control device 60. The object detection device detects a preceding vehicle which is driving or present on the driving lane in front of the own vehicle. The vehicle control device 60 performs a known vehicle control such as a collision avoidance control so as to avoid a collision with the preceding vehicle detected by the object detection device. Further, the vehicle control device 60 and the object detection device performs an adaptive cruise control (ACC) so as to adjust a vehicle speed of the own vehicle and to maintain the vehicle distance between the own vehicle and the preceding vehicle detected by the object detection device at the predetermined vehicle distance.

As shown in FIG. 1, the vehicle control system according to the exemplary embodiment has an electronic control unit 40 (hereinafter, the ECU 40) as the object detection device, the vehicle control device 60, etc. The ECU 40 and the vehicle control device 60 communicate with each other. The ECU 40 communicates with a radar device 20, an image acquisition device 30 and various types of detection sensors 50. FIG. 1 shows a yaw rate sensor 51, a vehicle speed sensor 52 and a steering angle sensor 53 as the detection sensors 50. The yaw rate sensor 51 is a gyroscopic device that measures a vehicle's angular velocity relative to its vertical axis. The angle between the vehicle's heading and vehicle actual movement direction is called slip angle, which is related to the yaw rate. The yaw rate sensor 51 detects the yaw rate of the own vehicle. The vehicle sensor 52 detects a vehicle speed of the own vehicle.

Figure 2:
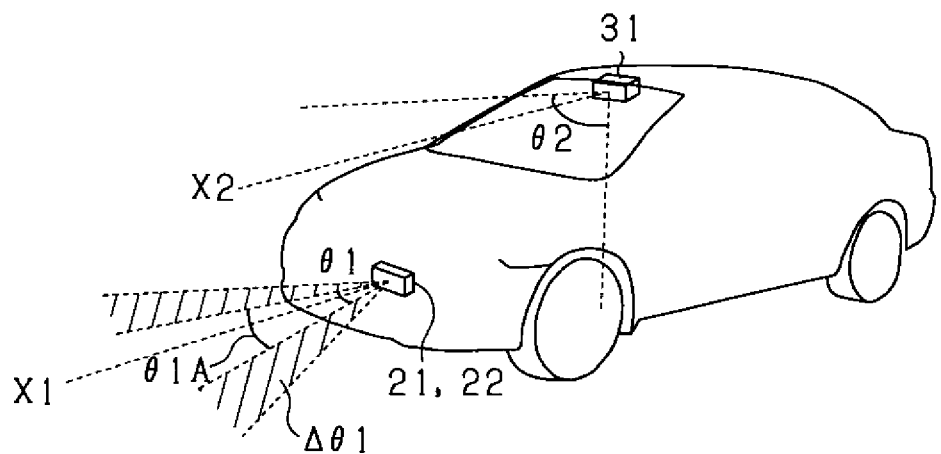
FIG. 2 is a view explaining a radar device and an image acquisition device mounted on an own vehicle equipped with the vehicle control system show in FIG. 1.

FIG. 2 is a view explaining the radar device 20 and the image acquisition device 30 mounted on the own vehicle shown in FIG. 1. That is, the vehicle control system has the radar device 20 and the image acquisition device 30 in addition to the ECU 40 and the vehicle control device 60.

The radar device 20 may be a millimeter wave radar, an ultrasonic radar, etc. A millimeter wave radar uses high frequency signals in a millimeter band. An ultrasonic radar uses ultrasonic waves. As shown in FIG. 2, the radar device 20 is arranged at a front side of the own vehicle.

The radar device 20 has a transmitter 21, a receiver 22 and a control part 23. The control part 23 corresponds to a radar detection object acquiring part and an object recognition part.

In more detail, as shown in FIG. 2, the transmitter 21 of the radar device 20 transmits radar waves within a predetermined-angle radar scanning range (as a radar detection object data acquiring range θ1) in front of the own vehicle relative to a predetermined reference axis X1 determined in front of the own vehicle. The receiver 22 receives reflection waves reflected by an object which is present within the receiver 22 in front of the own vehicle.

The control part 23 detects radar reflection points on the basis of the reflection waves which have been received by the receiver 22. The control part 23 selects, as a radar detection object, the radar reflection points which are close to each other. It is possible for the vehicle control system according to the exemplary embodiment to detect a direction of the radar detection object in front of the own vehicle, a vehicle distance between the own vehicle and the preceding vehicle as the radar detection object, and a relative speed between the own vehicle and the preceding vehicle and a relative acceleration between the own vehicle and the preceding vehicle on the basis of data of the radar detection object composed of the selected radar reflection points.

A description will now be given of the behavior of the control part 23 in the radar device 20 in more detail.

The control part 23 uses the radar reflection point received by the receiver 22 as an origin (0, 0, 0) which is the central point of the own vehicle, and determines an orthogonal coordinate system (omitted from the drawings) composed of X axis, Y axis, and Z axis. The X axis represents a body width direction of the own vehicle, the Y axis represents a height direction of the body of the own vehicle, and the Z axis represents a forward direction of the own vehicle.

In the orthogonal coordinate system, the control part 23 determines a group of the radar reflection points which satisfy three conditions (a), (b) and (c):

(a) a distance between the radar reflection point in the X axis direction is not more than a predetermined allowable value $\Delta x$;

(b) a distance between the radar reflection point in the Y axis direction is not more than a predetermined allowable value $\Delta y$; and (c) a distance between the radar reflection point in the Z axis direction is not more than a predetermined allowable value $\Delta z$.

Further, the control part 23 selects, as a representative radar reflection point, one of the radar reflection points in the group which satisfy the conditions (a), (b) and (c) previously described.

The control part 23 transmits information, i.e. the data of the radar detection object to the ECU 40.

The control part 23 performs a tracking process of continuously detecting, as the same object, the radar detection object obtained in time series. This tracking process makes it possible to recognize the same object in time series.

Figure 3:
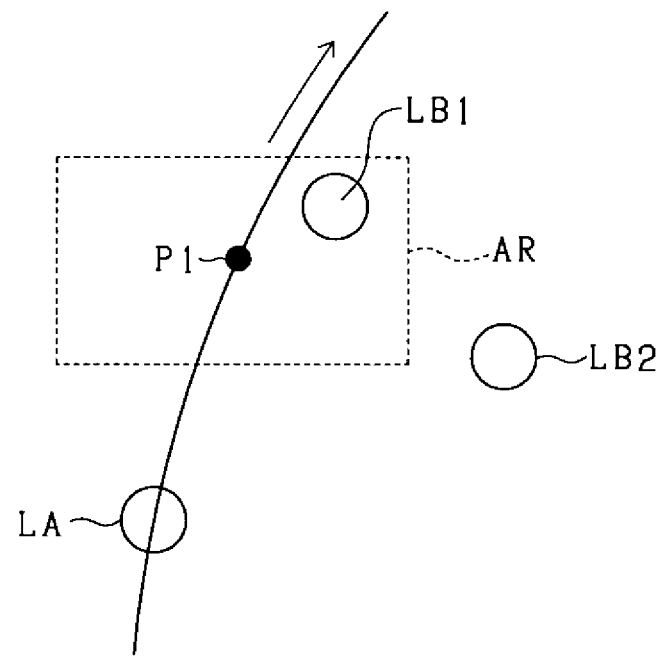
FIG. 3 is a view explaining a tracking process performed by the radar device mounted on the own vehicle shown in FIG. 2.

The tracking process will be explained in detail with reference to FIG. 3. FIG. 3 is a view explaining the tracking process performed by the radar device mounted on the own vehicle shown in FIG. 2.

When it is assumed that the preceding vehicle, i.e. a previously-obtained radar detection object LA moves on the driving lane from the previously-obtained location of the previously-obtained radar detection object LA at a relative speed between the own vehicle and the previously-obtained radar detection object LA, the control part obtains an estimated location P1 (X, Y) at which the previously-obtained radar detection object LA is present.

Next, the control part 23 determines an estimated movement range AR containing a predetermined error range around the estimated location P1 (X, Y) of the previously-obtained radar detection object LA.

When one or more of current radar detection objects currently detected are within the estimated movement range AR, the control part 23 recognizes the current radar detection objects belong to the same object corresponding to the previously-obtained radar detection object LA.

The control part 23 stores the data of the current radar detection objects associated with the previous radar detection object into a memory (not shown). In the case shown in FIG. 3, the control part 23 stores the data of the radar detection object LB1 associated with the previously-obtained radar detection object LA into the memory (not shown).

The radar reflection points at which the radar waves are transmitted from the transmitter 21 of the radar device 20 are easily affected by variation of the relative location between the own vehicle and the object, and a driving environment of the own vehicle. Accordingly, there is a possible case in which the radar device 20 temporarily cannot obtain the data of the radar detection object when temporarily detecting no radar reflection point even if the object is certainly present in front of the own vehicle.

The control part 23 performs the estimation process in which the estimated location of the radar detection object is repeatedly calculated even if it cannot receive the data of the radar detection object corresponding to the estimated location.

When detecting the radar detection object corresponding to the estimated location again, the control part 23 stores the data of the radar detection objects associated with the previous radar detection object into the memory (not shown).

A description will now be given of the explanation of the estimation process performed by the control part 23 with reference to FIG. 3. When there is no radar detection object which is within the previously-obtained radar detection object LA in the previous estimation process, the control part 23 determines that the relative speed and a lateral location of the radar detection object are as previously obtained, and calculates the estimated location P1 of the current radar detection object. The control part 23 determines the estimated movement range AR on the basis of the estimated location P1 of the current radar detection object. The control part 23 detects radar detection objects within the estimated movement range AR. The control part 23 repeatedly performs these steps. When detecting the radar detection object within the estimated movement range AR, the control part 23 stores the data of the current radar detection object associated with the previous radar detection object into the memory (not shown). This estimation process makes it possible to increase the recognition accuracy of an object in time series.

The image acquisition device 30 has an image acquisition part 31 and a control part 32.

The image acquisition part 31 is composed of a charge coupled device camera (CCD camera), a complementary metal oxide semiconductor image sensor (CMOS image sensor), a near-infrared camera, etc. As shown in FIG. 2, the image acquisition part 31 is arranged at a predetermined height and the central part in the body width direction of the own vehicle.

As shown in FIG. 2, the image acquisition part 31 acquires a forward view image as an acquired image within a predetermined acquiring range $\theta 2$ (which is wider than the radar detection object data acquiring range $\theta 1$, i.e., $\theta 2 > \theta 1$) in front of the own vehicle. The image acquisition part 31 transmits the acquired image as the forward view image to the control part 32 in the image acquisition device 30. FIG. 2 shows the example in which the predetermined acquiring range $\theta 2$ includes the radar detection object data acquiring range $\theta 1$. However, the concept of the present invention is not limited by this example. It is sufficient for a part of the radar detection object data acquiring range $\theta 1$ and a part of the predetermined acquiring range area $\theta 2$ to be overlapped with each other. The control part 32 in the image acquisition device 30 corresponds to an image object acquiring part.

The control part 32 acquires, as an image object, an object extracted from the acquired image (i.e. the forward view image) every time it receives the acquired image transmitted from the image acquisition part 31. The ECU 40 recognizes various data of the object such as the direction of the object to the own vehicle, location data which represents the distance between the own vehicle and the object, a size such as a lateral location of the object and a lateral width of the object, and a kind of the object. It is possible for the ECU

40 to perform a pattern matching process by using object models which have been stored in a memory (not shown).

The object models stored in the memory (not shown) have been classified into a moving object group and a stationary object. The moving object includes four wheel vehicles, two wheel vehicles (i.e. motorcycles), pedestrians, etc. The stationary object includes road traffic signs, guard rails, etc. The control part 32 transmits data of the acquired image objects to the ECU 40.

The ECU 40 is composed of a microcomputer equipped with a central processing unit (CPU), a read only memory (ROM), a random access memory (RAM), an input/output interface (I/O interface), etc.

As shown in FIG. 1, the ECU 40 has functions of a detection target object recognition part 41, an own vehicle driving line probability calculation part 42, a preceding vehicle selection part 43, an irregular-detection detecting part 44 and an association processing part 45. The irregular-detection detecting part 44 detects occurrence of an irregular detection in which when the plurality of radar reflection points obtained from a same object are divided into a plurality of groups, and a plurality of radar detection objects are detected on the basis of the plurality of reflection points obtained from the same object. This phenomenon will be referred with the "irregular detection". The irregular detection will be explained in detail later.

The functions of those parts 41 to 45 are realized when the CPU in the ECU 40 performs programs stored in the ROM, for example.

The ECU 40 receives detection signals and data transmitted from the yaw rate sensor 51, the vehicle speed sensor 52, the steering angle sensor 53, etc. The received detection signals and data represent various parameters of the radar detection object, the image object, the yaw rate of the own vehicle, the vehicle speed of the own vehicle and the steering angle of the own vehicle. The ECU 40 stores the received detection signals as the various parameters into a memory (not shown). The ECU 40 corresponds to the object detection device according to the exemplary embodiment.

When determining that the radar detection object and the image object are generated from the same object, the detection target object recognition part 41 recognizes the same object as a detection target object. The detection target object is a target object to be controlled by the vehicle control device 60 according to the exemplary embodiment. That is, the vehicle control device 60 performs the vehicle control process of the own vehicle on the basis of data of the detection target object.

For example, the detection target object recognition part 41 performs the control process in which the radar detection object and the image object are plotted on a common orthogonal coordinate system (omitted from the drawings) composed of the X axis, the Y axis, and the Z axis. The detection target object recognition part 41 further determines a predetermined image scanning range. The predetermined image scanning range represents the scanning range including an error component of a location at which the image object is detected.

When there is an image object which is present within the predetermined image scanning range, the detection target object recognition part 41 determines that this image object and the radar-detection part have been generated from the same object and recognizes the image object as the detection target object.

The own vehicle driving line probability calculation part 42 calculates an own vehicle driving line probability of the detection target object. The own vehicle driving line probability represents a parameter which is gradually reduced from an estimated driving line of the own vehicle as the radar detection object is offset gradually away from the estimated driving line of the own vehicle in the width direction (the left hand side direction and the right hand direction) of the body of the own vehicle.

It is possible for the ECU 40 to obtain the estimated driving line of the own vehicle on the basis of a yaw rate value detected by the yaw rate sensor 51, a detection history of a white boundary lane detected from the acquired image transmitted from the image acquisition device 30, and a detection history of the driving location of another vehicle such as the preceding vehicle which is running in front of the own vehicle.

The calculation method of calculating the estimated driving line of the own vehicle is known and the explanation of the calculation method is omitted for brevity.

In general, because radar reflection points on a radar detection object easily vary, there is a possible case in which a temporal value of the own vehicle driving line probability contains an error.

The own vehicle driving line probability calculation part 42 uses a time-series filter so as to perform a smoothing process. The smoothing process smooths a temporal value of the own vehicle driving line probability of the detection target object. The smoothing process reduces the own vehicle driving line probability of an unstable detection target object. The calculation method of the own vehicle driving line probability will be explained later in detail.

The preceding vehicle selection part 43 selects, as a preceding vehicle, the detection target object which satisfies a predetermined condition.

Figure 4:
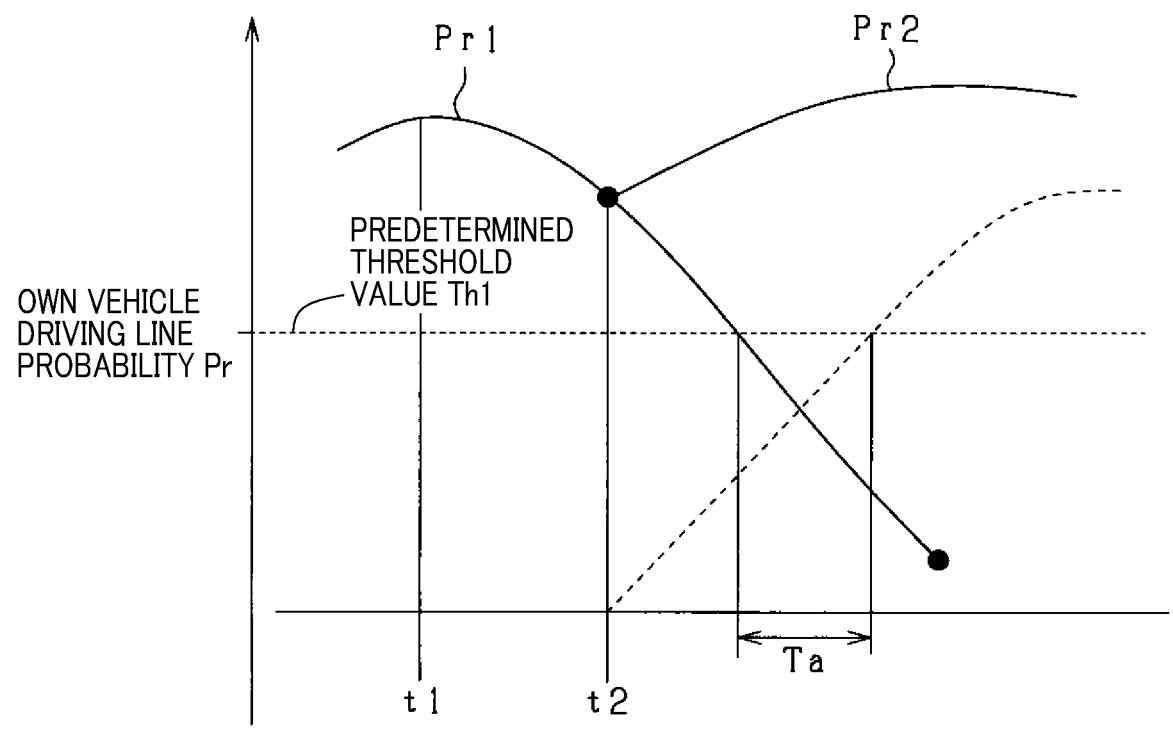
FIG. 4 is a view explaining an own vehicle driving line probability through which the own vehicle would drive.

FIG. 4 is a view explaining an own vehicle driving line probability. As shown in FIG. 4, in the object detection device according to the exemplary embodiment, the preceding vehicle selection part 43 selects the detection target object when the own vehicle driving line probability Pr is higher than a predetermined threshold value Th1 and a vehicle distance between the own vehicle and the detection target object is less than a predetermined vehicle distance. In this case, the preceding to vehicle selection part 43 selects and determines the detection target object as the preceding vehicle when the number of the detection target objects satisfying these conditions is one.

On the other hand, when the number of the detection target objects satisfying these conditions is more than one, the preceding vehicle selection part 43 selects, as the preceding vehicle, the detection target object having the minimum vehicle distance.

As previously explained, because radar reflection points on a radar detection object easily vary, there is a possible case in which when the plurality of radar reflection points obtained from the same object are divided into a plurality of groups, a plurality of radar detection objects are detected on the basis of the plurality of reflection points obtained from the same object. This phenomenon will be referred with the "irregular detection".

If the irregular detection previously described occurs, one of the radar detection objects is associated with the data of the history data of the past radar detection object. In other words, when such an irregular detection previously described occurs, the radar detection object associated with the past radar detection object and a new radar detection object not associated with the past radar detection object are generated from the same object.

When the irregular detection previously described occurs in the object as the preceding vehicle, the ECU 40, i.e. the object detection device according to the exemplary embodiment obtains both the radar detection object (as a first object L1) and a new radar detection object (as a second object L2), where the first object L1 is associated with the past radar detection object and to be used for selecting the preceding vehicle, and the second object L2 is also associated with the past radar detection object, but not to be used for selecting the preceding vehicle.

In this situation, when the first object L1 is stably, i.e. continuously detected, the preceding vehicle selection part 43 can continuously select the same detection target object as the preceding vehicle on the basis of the detected first object L1. However, under the irregular detection previously described, there is a possible case in which the first object L1 would gradually become not recognized. That is, the reliability of the own vehicle driving line probability Pr obtained from the first object L1 is gradually reduced and finally reaches a small value which is less than the predetermined threshold value Th1 under the irregular detection previously described. This situation causes a possible case in which it is difficult for the preceding vehicle selection part 43 to correctly select the same detection target object as the preceding vehicle on the basis of the first object L1.

On the other hand, when the preceding vehicle selection part 43 continuously selects the second object L2 under the irregular detection previously described, the reliability of the own vehicle driving line probability Pr obtained from the second object L2 gradually increases. When the own vehicle driving line probability Pr becomes greater than the predetermined threshold value Th1, it is possible for the preceding vehicle selection part 43 to select the same detection target object as the preceding vehicle on the basis of the second object L2.

When the own vehicle driving line probability Pr obtained from the first object L1 becomes smaller than the predetermined threshold value Th1 before the own vehicle driving line probability Pr obtained from the second object L2 becomes greater than the predetermined threshold value Th1, it becomes difficult for the preceding vehicle selection part 43 to select the same detection target object as the preceding vehicle by using one of the first object L1 and the second object L2. In this case, the preceding vehicle selection part 43 temporarily loses the preceding vehicle in front of the own vehicle on the own vehicle lane.

In order to avoid this problem, the object detection device according to the exemplary embodiment performs an association process in which the history data of the own vehicle driving line probability Pr obtained from the first object L1 is associated with the own vehicle driving line probability Pr obtained from the second object L2.

A description will now be given of a detailed explanation of association process.

The irregular-detection detecting part 44 performs an irregular detection occurrence detection process which detects whether the irregular detection previously described occurs in the detection target object selected as the preceding vehicle.

For example, it is possible for the irregular-detection detecting part 44 to determine that the irregular detection occurs in the detection target object selected as the preceding vehicle when there is a radar detection object which performs the following behavior. That is, the irregular-detection detecting part 44 determines occurrence of the irregular detection when the distance in the width direction between the own vehicle and the first object L1 is less than the predetermined distance (i.e. is narrower the body width of the own vehicle), and when a radar detection object (as the second object L2) is present, which satisfies the condition that the distance between the radar detection object and the first object L1 is within a predetermined error range and the relative speed between the radar detection object and the first object L1 is within a predetermined error range.

In the association process performed when the irregular detection previously described has occurred, the association processing part 45 determines an initial value of the own vehicle driving line probability Pr of the second object L2 on the basis of, i.e. by using the history data of the own vehicle driving line probability Pr of the first object L1.

When the detection target object is selected as the preceding vehicle on the basis of the first object L1, the between the radar detection object and the first object L1, the own vehicle driving line probability Pr obtained from the first object L1 satisfies the predetermined condition, i.e. becomes higher than the predetermined threshold value Th1. Accordingly, the initial value of the own vehicle driving line probability Pr obtained from the second object L2 becomes higher than the predetermined threshold value Th1.

Accordingly, even if the detection value of the own vehicle driving line probability Pr obtained from the second object L2 does not satisfy the selection condition for the preceding vehicle, this makes it possible to select the same object as the preceding vehicle by using the second object L2. That is, this makes it possible to correctly select the same detection target object as the preceding vehicle by using the data of the second object L2.

The radar detection object data acquiring range $\theta 1$ includes a wide-angle radar scanning area $\Delta\theta 1$, the radar scanning angle of which relative to the predetermined reference axis X1 is wider than a predetermined radar scanning angle $\theta 1A$ relative to the predetermined reference axis X1. In the wide-angle radar scanning area $\Delta\theta 1$, the radar reflection points easily becomes unstable and the irregular detection previously described often occurs (see FIG. 2) when compared with the radar reflection points in a small angle area, the radar scanning angle of which is smaller than predetermined radar scanning angle $\theta 1A$ measured relative to the predetermined reference axis X1.

This small angle area which is smaller than the predetermined radar scanning angle $\theta 1A$ measured relative to the predetermined reference axis X1 corresponds to a first angle area. On the other hand, the wide area, the radar scanning angle of which is smaller than the predetermined radar scanning angle $\theta 1A$ measured relative to the predetermined reference axis X1, corresponds to a second angle area.

The preceding vehicle selection part 43 reduces a probability of selecting the radar detection object as the preceding vehicle when the radar detection object is detected within the wide-angle radar scanning area $\Delta\theta 1$ in the radar detection object data acquiring range $\theta 1$.

For example, the preceding vehicle selection part 43 selects the detection target object as the preceding vehicle when the detection target object has been recognized within a small-angle radar scanning area which is narrower than the predetermined radar scanning angle $\theta 1A$ in the radar detection object data acquiring range $\theta 1$ and a vehicle distance threshold value Dsel is less than the first vehicle distance A1.

On the other hand, the preceding vehicle selection part 43 selects the detection target object as the preceding vehicle when this detection target object has been recognized within a wide-angle radar scanning area $\Delta\theta 1$ in the radar detection object data acquiring range $\theta 1$ and the vehicle distance threshold value Dsel is less than, i.e. shorter than a second vehicle distance A2 which is shorter than the first vehicle distance A1.

The control process previously described makes it possible to reduce the probability of selecting the object as the preceding vehicle because the object recognized within the wide-angle radar scanning area Δθ1 which easily causes the irregular detection previously described does not satisfy the condition unless the radar detection object becomes more close in location to the own vehicle when compared with a radar detection object recognized within the small angle radar scanning area, the radar scanning angle of which is narrower than the predetermined radar scanning angle θ1A.

When the own vehicle makes a right turn or a left turn, for example at an intersection on the own driving lane, there is a high probability in which the wide-angle radar scanning area Δθ1 of the radar device 20 becomes on the own vehicle driving line (on the estimated driving lane). In order to avoid this, it is preferable to perform the process previously described only when the own vehicle makes a right turn or a left turn.

It is preferable to use the distance threshold value Dsel which is equal to the first vehicle distance A1 between the own vehicle and the object which has been recognized as the preceding vehicle and even if the radar detection object is detected within the wide-angle radar scanning area Δθ1. This makes it possible to stably select the same object as the preceding vehicle.

There is a possible case in which the object detection device according to the exemplary embodiment detects occurrence of the irregular detection previously described when another vehicle is present, which performs the same behavior of the recognized preceding vehicle. For example, there is a possible case in which the object detection device according to the exemplary embodiment incorrectly recognizes the occurrence of the irregular detection when the own vehicle drives on a road having a plurality of driving lanes and the preceding vehicle and another vehicle are running parallel on different driving lanes.

In order to avoid the incorrect recognition previously described, the irregular-detection detecting part 44 in the ECU 40 detects whether the first object L1 and the second object L2 belong to the same object (the preceding vehicle only) or different objects (the preceding vehicle and another vehicle), respectively. For example, when it is possible to correspond both the first object L1 and the second object L2 with the same image object, the irregular-detection detecting part 44 determines that the irregular detection has occurred.

On the other hand, when the first object L1 and the second object L2 cannot be associated with same image object, i.e. when it is difficult to link first object L1 and the second object L2 to the same image object, the irregular-detection detecting part 44 determines that the irregular detection has not occurred.

The vehicle control device 60 according to the exemplary embodiment performs the various vehicle control operations relative to the detection target object recognized by the detection target object recognition part 41. That is, when determining that it is necessary to perform the driving assist control of the detection target object for maintaining safety driving, the vehicle control device 60 transmits control signals to various safety devices such as a seat-belt tightening device (or a safety belt tightening device), a brake device, a speaker device, etc. so as to operate them. The speaker device provides warning sound, a voice guide sound, etc. to the driver of the own vehicle, for example.

The vehicle control device 60 performs the adaptive cruise control (ACC) to adjust the vehicle speed of the own vehicle so as to maintain a vehicle distance between the own vehicle and the preceding vehicle at a predetermined vehicle distance when the detection target object is selected as the preceding vehicle. When no detection target object is selected as the preceding vehicle, the vehicle control device 60 performs the ACC to adjust the vehicle speed of the own vehicle at a constant vehicle speed (normal driving).

When not selecting the previously-detected preceding vehicle, i.e. when the selection of the previously-detected preceding vehicle has been released, the vehicle control device 60 accelerates or decelerates the own vehicle so as to set the vehicle speed of the own vehicle to a predetermined vehicle speed. The vehicle control device 60 corresponds to a vehicle speed control part.

However, under an unstable state which causes the irregular detection previously described, there is a possible risk in which the selection of the preceding vehicle is released even if the preceding vehicle is present on the own driving lane in front of the own vehicle. In this possible risk, when the own vehicle is accelerated when the preceding vehicle is running on the own driving lane in front of the own vehicle, there is possible danger in which the own vehicle would collide with the preceding vehicle.

In order to avoid such a possible dangerous risk, the vehicle control device 60 allows the own vehicle to only reduce its vehicle speed at a timing when the irregular detection occurs in the object to be used for selecting the presence of the preceding vehicle when it is recognized that the preceding vehicle is not selected. For example, the vehicle control device 60 prohibits the own vehicle from accelerating or suppresses the acceleration of the own vehicle from being less than a predetermined acceleration speed. This control makes it possible to suppress the acceleration of the own vehicle and to provide the safe driving of the own vehicle.

A description will now be given of the control process performed by the radar device 20 and the ECU 40 with reference to FIG. 5 and FIG. 6.

Figure 5:
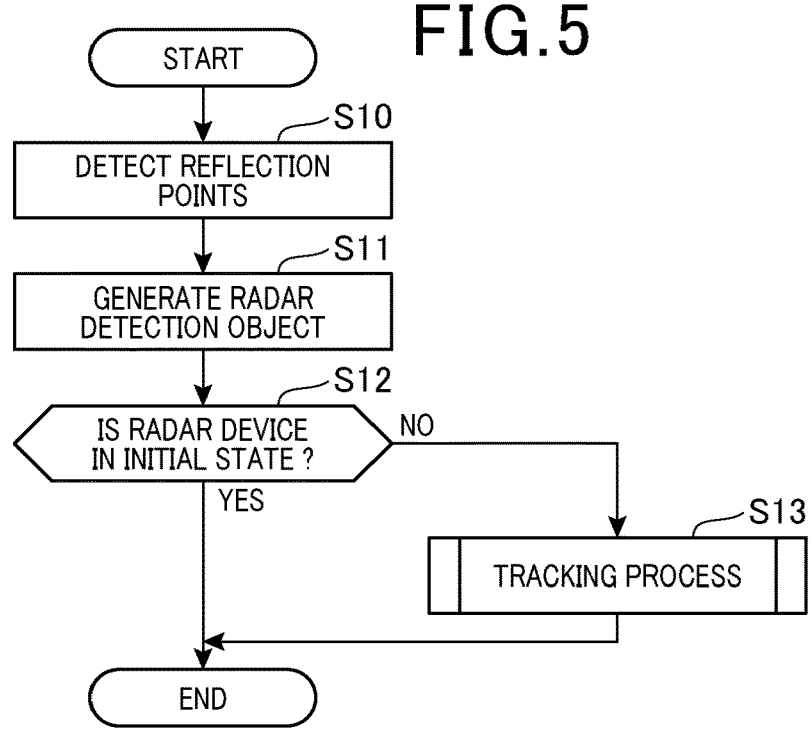
FIG. 5 is a flow chart showing a control process performed by the radar device in the object detection system according to the exemplary embodiment of the present invention.

FIG. 5 is a flow chart showing the control process performed by the radar device 20 in the object detection system according to the exemplary embodiment of the present invention. FIG. 6 is a flow chart showing a tracking process which is a subroutine in the control process shown in FIG. 5 performed by the radar device 20. The radar device 20 repeatedly performs the control process as the object detection process shown in FIG. 5 and FIG. 6. That is, the radar device 20 performs the control process shown in FIG. 5 and FIG. 6 every time the transmitter 21 transmits the radar waves and the receiver 22 receives the radar waves transmitted from the transmitter 21 of the radar device 20 and reflected from the detection target object.

Figure 7:
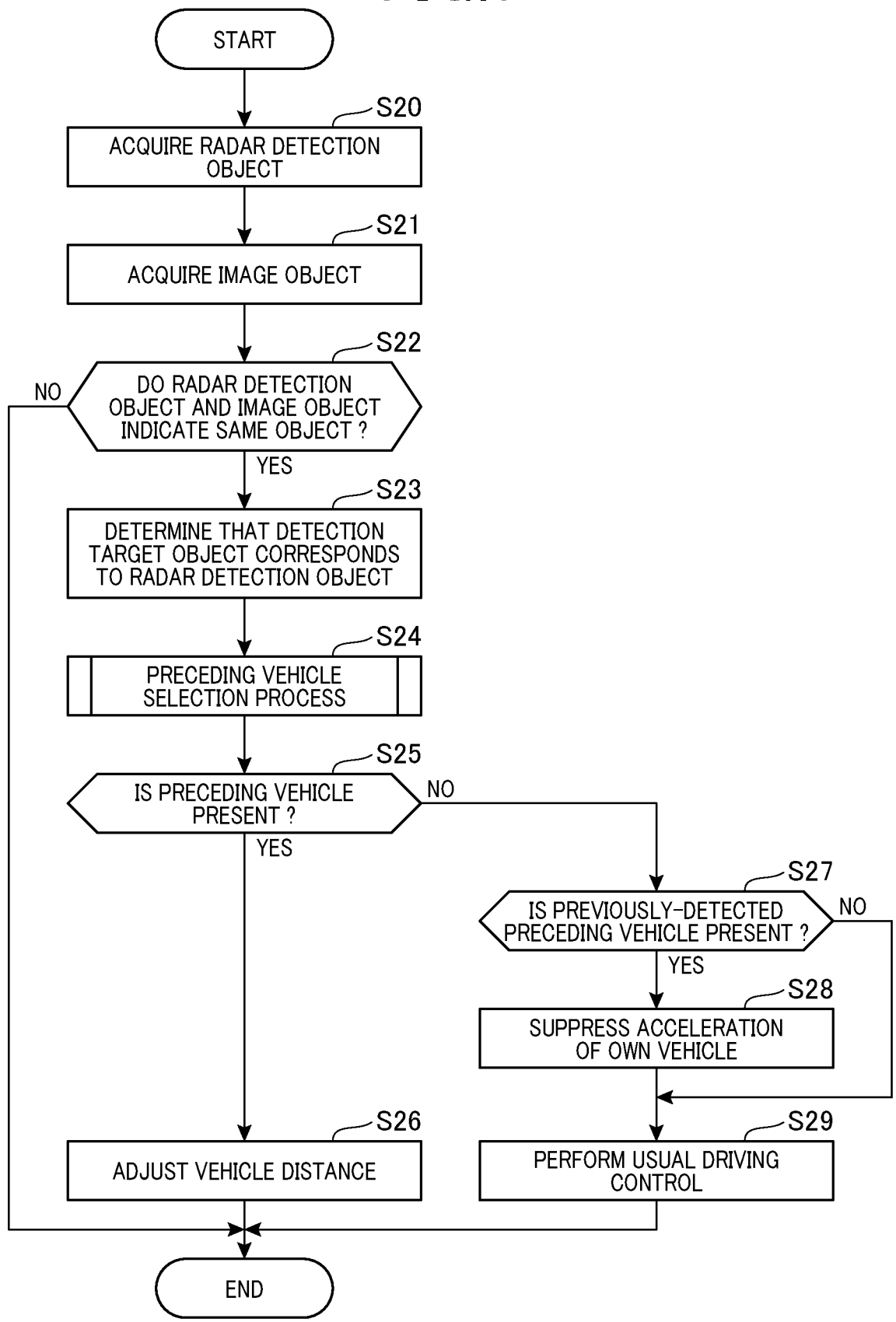
FIG. 7 is a flow chart showing a vehicle control process performed by the vehicle control system according to the exemplary embodiment of the present invention.

FIG. 7 is a flow chart showing the vehicle control process performed by the vehicle control system having the ECU 40 and the vehicle control device 60 according to the exemplary embodiment of the present invention.

As previously explained, the vehicle control system has the radar device 20, the image acquisition device 30, the ECU 40 as the object detection device, and the vehicle control device 60.

Figure 8:
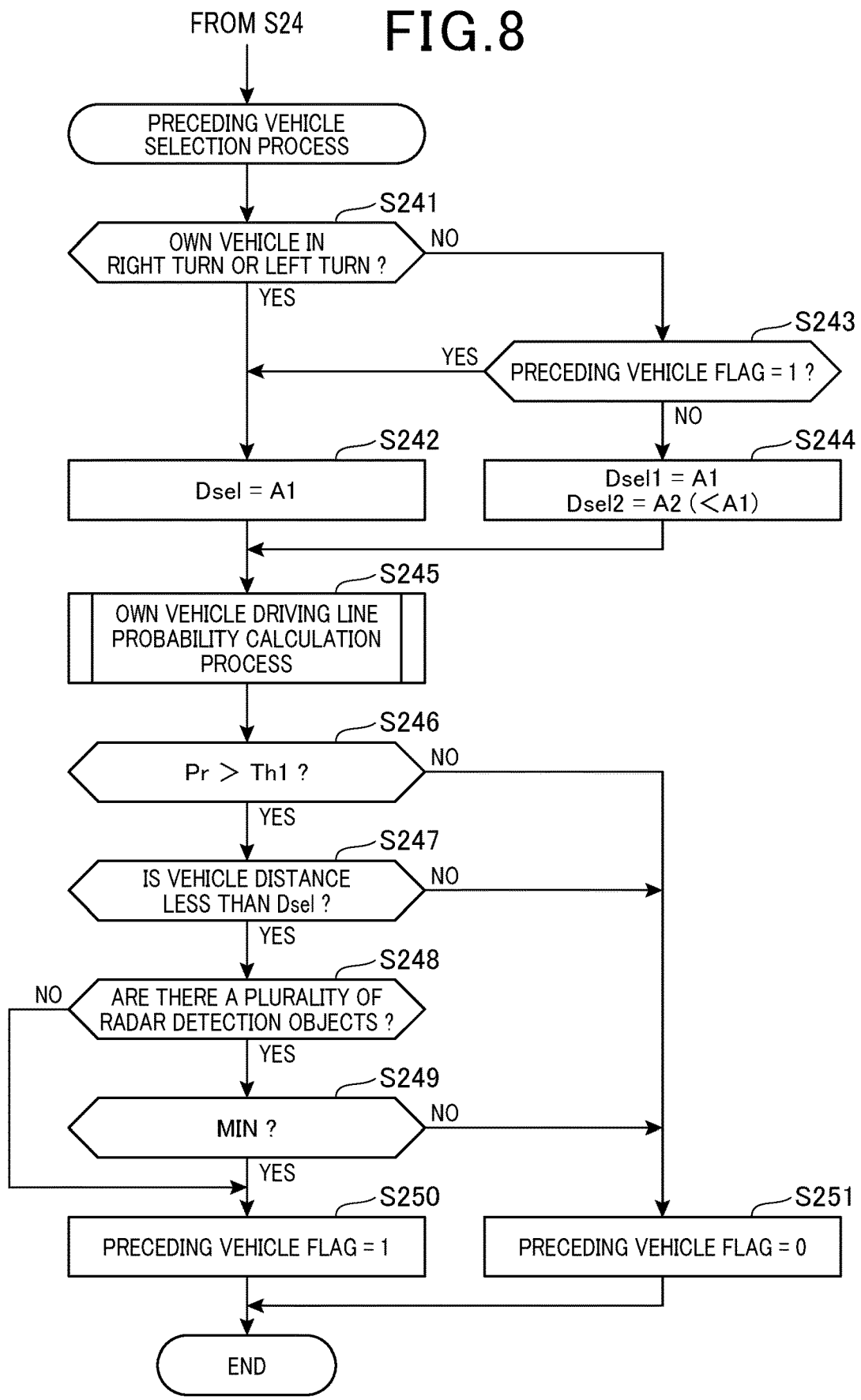
FIG. 8 is a flow chart of a preceding vehicle selection process which is a subroutine in the vehicle control process shown in FIG. 7.
Figure 9:
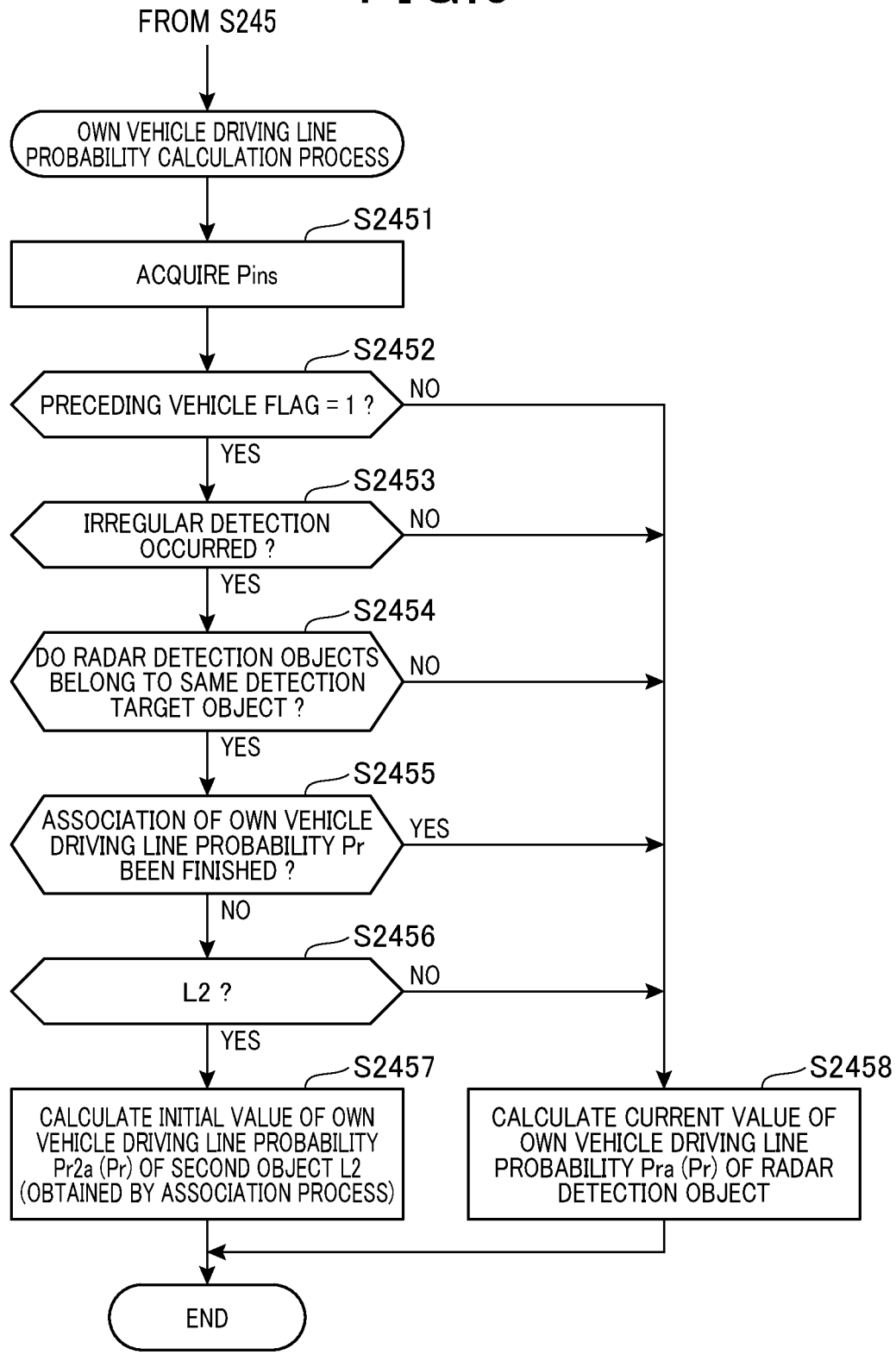
FIG. 9 is a flow chart showing an own vehicle driving line probability calculation process capable of calculating an own vehicle driving line probability of the own vehicle, which is a subroutine in the preceding vehicle selection process shown in FIG. 8.

FIG. 8 is a flow chart showing the preceding vehicle selection process which is a subroutine in the vehicle control process shown in FIG. 7. FIG. 9 is a flow chart showing the own vehicle driving line probability calculation process capable of calculating an own vehicle driving line probability, which is a subroutine process in the preceding vehicle selection process shown in FIG. 8.

The vehicle control system having the ECU 40 and the vehicle control device 60 according to the exemplary embodiment performs the vehicle control process shown in FIG. 7 to FIG. 9. That is, the ECU 40 and the vehicle control device 60 in the vehicle control system according to the exemplary embodiment performs the vehicle control processes shown in FIG. 7, FIG. 8 and FIG. 9 every time the radar device 20 detects the radar detection object.

A description will be given of the tracking process performed by the radar device 20 with reference to FIG. 5 and FIG. 6.

When the control part 23 of the radar device 20 detects reflection points of the received radar waves in the main-routine shown in FIG. 5 (step S10), the radar device 20 groups the reflection points which are close to each other so as to generate a radar detection object (step S11).

The control part 23 detects whether the radar device 20 is in an initial state (step S12). When the radar device 20 transmits radar waves the first time, the detection result in step S12 represents positive ("YES" in step S12). When the detection result in step S12 represents positive ("YES" in step S12), the radar device 20 finishes the tracking process shown in FIG. 5 and FIG. 6. That is, when the radar device 20 is in an initial state, the control part 23 makes a new radar detection object at the initial state. On the other hand, when the detection result in step S12 represents negative ("NO" in step S12), i.e. represents that the radar device 20 is not in the initial state, the control part 23 updates data of the radar detection objects, and the operation flow progresses to step S13. Step S13 shows a subroutine of the tracking process.

Figure 6:
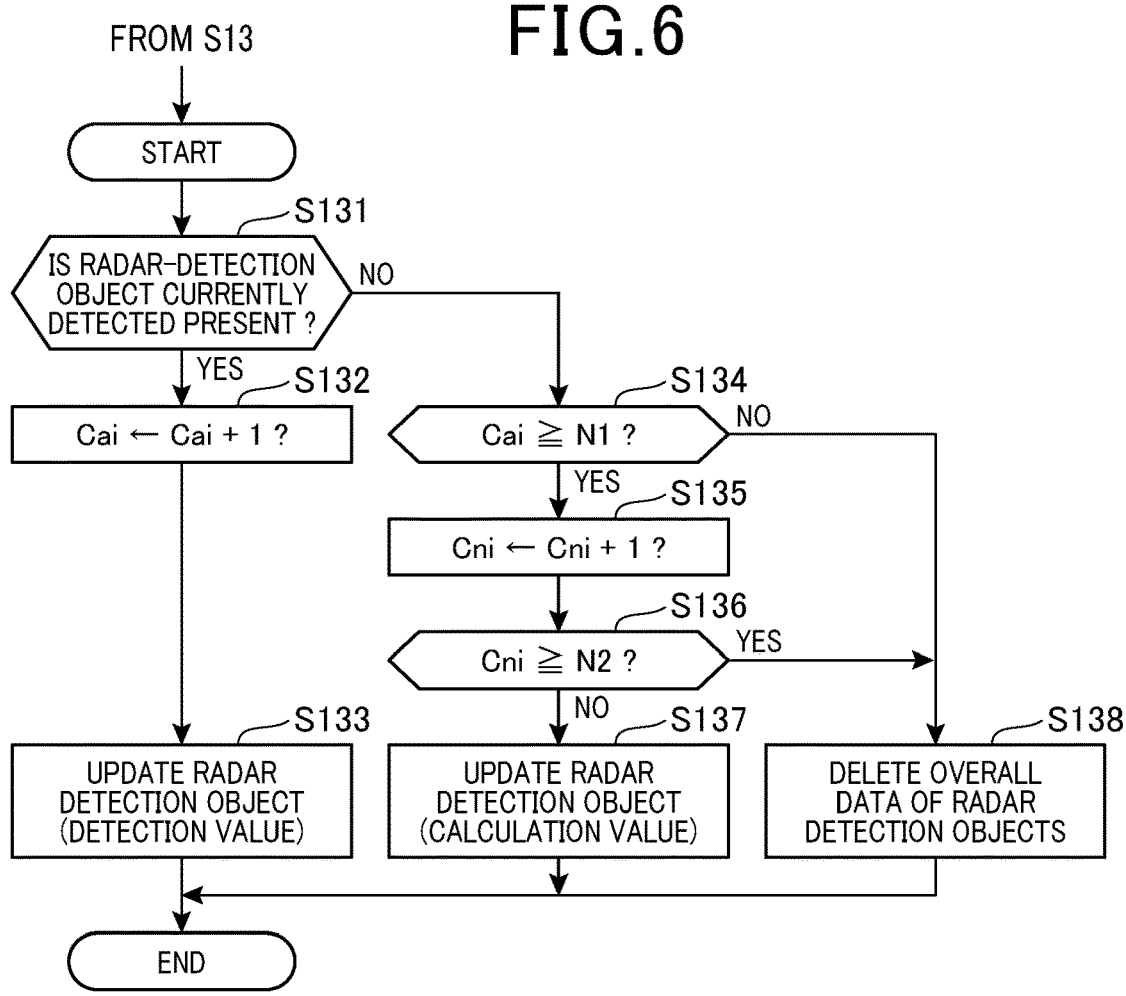
FIG. 6 is a flow chart showing a tracking process which is a subroutine in the control process shown in FIG. 5 performed by the radar device.

In the subroutine shown in FIG. 6 in the tracking process shown in FIG. 5, the control part 23 in the radar device 20 detects whether the radar detection object currently detected is present at the estimated location P1 (within the estimated movement range AR) (step S131), for example, like the case shown in FIG. 3 previously described.

When the detection result represents positive ("YES" in step S131), i.e. represents that the radar detection object currently detected is present at the estimated location P1, the operation flow progresses to step S132.

In step S132, the control part 23 increases an acquisition counter Cai by one (step S132). The acquisition counter Cai provides the number of times when the radar detection object is acquired.

The control part 23 updates the radar detection object so that the currently detected radar detection object corresponds to the previously detected radar detection object (step S133).

On the other hand, when the detection result represents negative ("NO" in step S131), i.e. represents that the radar detection object does not correspond to the estimated location P1 (within the estimated movement range AR), the operation flow progresses to step S134.

In step S134, the control part 23 detects whether the value of the acquisition counter Cai is not less than a predetermined count judgment value N1.

When the detection result in step S134 represents positive ("YES" in step S134), i.e. Cai<N1, the operation flow progresses to step S138.

In step S138, the control part 23 deletes the data of all radar detection objects from the memory (not shown). That is, during the period in which the data of the radar detection objects corresponding to the estimated location P1 are stored, the value of the acquisition counter Cai gradually increases.

On the other hand, when an additional radar detection object corresponding to the estimated location P1 is not detected, the control part 23 deletes the data of the radar detection objects. Because this erasure process erases the data of radar detection objects temporarily acquired, unnecessary objects located at a shoulder of the driving lane of the own vehicle can be eliminated, and the control part 23 can correctly detect the detection target object (such as the preceding vehicle) with high accuracy.

On the other hand, when the value of the acquisition counter Cai is not less than the predetermined count judgment value N1 ("YES" in step S134), the operation flow progresses to step S135.

In step S135, the control part 23 increases a non-acquisition counter Cni by one. The value of the non-acquisition counter Cni represents a period counted from a time when no radar detection object is acquired. The operation flow progresses to step S136.

In step S136, the control part 23 detects whether the value of the non-acquisition counter Cni is not less than a predetermined count judgment value N2.

When the value of the non-acquisition counter Cni is not less than the predetermined count judgment value N2 ("YES" in step S136), i.e. the radar detection object corresponding to the estimated location P1 is not continuously detected during the N2 period, the operation flow progresses to step S138.

In step S138 previously described, the control part 23 deletes the data of all radar detection objects from the memory (not shown).

On the other hand, when the value of the non-acquisition counter Cni is less than the predetermined count judgment value N2 ("NO" in step S136), the operation flow progresses to step S137.

In step S137, the control part 23 in the radar device 20 calculates data of the currently-detected radar detection object. Specifically, the control part 23 calculates the location of the currently-detected radar detection object if a relative speed between the object recognized by using the currently-detected radar detection object and the object recognized by using the previously-detected radar detection object does not vary, and a lateral position between the currently detected radar detection object and the currently-detected radar detection object does not vary.

According to the tracking process shown in FIG. 5 and FIG. 6 previously explained, it is possible for the object detection device according to the exemplary embodiment to correctly detect the radar detection object corresponding to the same object even if the radar detection object, which has been recognized during the period of not less than the predetermined count judgment value N1, is missed temporarily (within the period which is less than the predetermined count judgment value N2), and the control part 23 detects the radar detection object again ("YES" in step S131).

The control part 23 in the radar device 20 performs the tracking process shown in FIG. 5 and FIG. 6 for the currently detected all radar detection objects, and recognizes each object in time series on the basis of each of the radar detection objects.

Next, a description will be given of the various processes shown in FIG. 7, FIG. 8 and FIG. 9 performed by the vehicle control system according to the exemplary embodiment shown in FIG. 1.

The main routine shown in FIG. 7, the radar device 20 acquires the radar detection objects (step S20), and the image acquisition device 30 acquires the image objects (step S21). The operation flow progresses to step S22.

In step S22, the ECU 40 receives the data transmitted from the radar device 20 and the data transmitted from the image acquisition device 30. The ECU 40 detects whether the radar detection objects and the image objects have been generated on the basis of a same object (or a same detection target object).

When the detection result represents negative ("NO" in step S22), i.e. represents that the radar detection objects and the image objects have not been generated on the basis of the same object, the ECU 40 finishes the main routine shown in FIG. 7.

On the other hand, when the detection result represents positive ("YES" in step S22), i.e. represents that the radar detection objects and the image objects have been generated on the basis of the same object, the operation flow progresses to step S23.

In step S23, the ECU 40 determines which of the detection target object corresponding to the radar detection objects and the image objects. The operation flow progresses to step S24.

In step S24, the ECU 40 performs a preceding vehicle selection process.

A description will be given of the preceding vehicle selection process with reference to FIG. 8.

The ECU 40 detects whether the own vehicle makes a right turn or a left turn on the own driving lane in step S241.

When the detection result represents negative ("NO" in step S241), i.e. represents that the own vehicle does not make any a right turn or a left turn on the own driving lane, the ECU 40 sets the vehicle distance threshold value Dsel to the first vehicle distance A1 (i.e. Dsel=A1) (step S242).

On the other hand, when the detection result in step S241 represents positive ("YES" in step S241), i.e. represents that the own vehicle makes one of a right turn and a left turn on the own driving lane, the ECU 40 detects whether a preceding vehicle flag is 1 (step S243).

The preceding vehicle flag has the value of 1 when no detection target object is selected as a preceding vehicle. On the other hand, the preceding vehicle flag has the value of 0 when the detection target object is not selected as the preceding vehicle. The preceding vehicle flag has the value of 0 at the beginning state (or the initial state).

When the detection result in step S243 represents positive ("YES in step S243), i.e. represents that the value of the preceding vehicle flag is 1, the ECU 40 sets the vehicle distance threshold value Dsel to the first vehicle distance A1 (i.e. Dsel=A1) (step S242).

On the other hand, when the value of the preceding vehicle flag is 0 ("NO" in step S243), the ECU 40 sets the first vehicle distance threshold value Dsel2 to the first vehicle distance A1 (i.e. Dsel=A1), and sets a second vehicle distance threshold value Dsel2 to the second vehicle distance A2 (i.e. Dsel2=A2<A1).

The first vehicle distance threshold value Dsel1 represents a vehicle distance within an angle which is narrower than the predetermined radar scanning angle θ1A. The second vehicle distance threshold value Dsel2 represents a vehicle distance within the wide-angle radar scanning area Δθ1. The operation flow progresses to step S245.

In step S245, the ECU 40 performs the own vehicle driving line probability calculation process so as to calculate the own vehicle driving line probability Pr of the radar detection object. FIG. 9 shows a detailed flow chart of the own vehicle driving line probability calculation process in step S245.

In step S2451 shown in FIG. 9, the ECU 40 calculates an instantaneous value Pins of the own vehicle driving line probability Pr of the radar detection object. The operation flow progresses to step S2452.

In step S2452, the ECU 40 detects whether the preceding vehicle flag is 1.

When the detection result represents positive ("YES" in step S2452), i.e. represents that the preceding vehicle flag is 1, the operation flow progresses to step S2453.

In step S2453, when the first object L1 and the second object L2 have been acquired, the detection result represents positive ("YES" in step S2453), i.e. the ECU 40 determines that the irregular detection has occurred. As previously explained, the first object L1 has been associated with the past radar detection object and to be used for selecting the preceding vehicle, and the second object L2 is also associated with the past radar detection object, but not to be used for selecting the preceding vehicle.

When the irregular detection has occurred ("YES" in step S2453), the operation flow progresses to step S2454.

In step S2454, the ECU 40 detects whether these radar detection objects belong to the same detection target object. When the detection result in step S2454 represents positive ("YES" in step S2454), i.e. represents that these radar detection objects belong to the same detection target object, the operation flow progresses to am step S2455.

In step S2455, the ECU 40 detects whether the association process of the own vehicle driving line probability Pr has been finished.

When the detection result represents negative ("NO" in step S2455), i.e. represents that the association process of the own vehicle driving line probability Pr has not been finished, the operation flow progresses to step S2456.

In step S2456, the ECU 40 detects whether the radar detection object to be processed is the second object L2.

When the detection result in step S2456 represents positive ("YES" in step S2456), i.e. represents that the radar detection object to be processed is a second object L2, the operation flow progresses to step S2457.

In step S2457, the ECU 40 performs the association process using the following equation (1).

$$Pr2a = (1-a) \times Pins + a \times Pr1b \quad (1),$$

where Pr2a represents the current value of the second object L2, Pr1b represents the previously value (or a past value) of the own vehicle driving line probability Pr of the first object L1, Pins represents an instantaneous value of the own vehicle driving line probability Pr of the second object L2 currently acquired, and the value a represents a smoothing coefficient.

On the other hand, when the detection result represents negative ("NO" in step S2456), i.e. represents that the radar detection object to be processed is not the second object L2, the operation flow progresses to step S2458.

In step S2458, the ECU 40 calculates a current value of the own vehicle driving line probability Pr on the basis of a past value of the own vehicle driving line probability Pr and the instantaneous value Pins of the own vehicle driving line probability Pr acquired from the same radar detection object by using the following equation (2).

For example, the ECU 40 calculates a current value of the own vehicle driving line probability Pr of the first object L1 on the basis of a past value of the own vehicle driving line probability Pr of the first object L1 and the instantaneous value Pins of the own vehicle driving line probability Pr of the first object L1.

$$Pra = (1-a) \times Pins + a \times Prb \quad (2),$$

where Pra represents the current value of the own vehicle driving line probability Pr of the radar detection object, Pins is represents an instantaneous value of the own vehicle driving line probability Pr of the radar detection object, Prb represents a previously value of the own vehicle driving line probability Pr of the radar detection object, and the value a represents a smoothing coefficient of being less than 1 (a<1).

When the detection result in step S2452 represents negative ("NO" in step S2452), i.e. represents the preceding vehicle flag=0, when the detection result in step S2453 represents negative ("NO" in step S2453), i.e. represents that the irregular detection has occurred, when the detection result in step S2454 represents negative ("NO" in step S2454), i.e. represents that the plurality of the radar detection objects do not belong to the same detection target object, and when the detection result represents negative ("YES" in step S2455), i.e. represents that the association process of the own vehicle driving line probability Pr has been finished, the operation flow progresses to step S2458.

In step S2458, the ECU 40 calculates the current value of the own vehicle driving line probability Pr by using the following equation (2).

When the current value of the own vehicle driving line probability Pr (i.e. Pr2a or Pra) of each of the radar detection objects is calculated by the processes shown in FIG. 9, the operation flow returns to step S246 shown in FIG. 8.

In step S246, the ECU 40 detects whether the current value of the own vehicle driving line probability Pr of the radar detection object is larger than the predetermined threshold value Th1.

When the detection result in step S246 represents positive ("YES" in step S246), i.e. represents that the current value of the own vehicle driving line probability Pr of the radar detection object is larger than the predetermined threshold value Th1, the operation flow progresses to step S247.

In step S247, the ECU 40 detects whether the vehicle distance is less than the predetermined vehicle distance threshold value Dsel.

When the detection result in step S247 represents positive ("YES" in step S247), i.e. represents that the vehicle distance is less than the predetermined vehicle distance threshold value Dsel, the operation flow progresses to step S248.

In step S248, the ECU 40 detects whether there are a plurality of radar detection objects which satisfy the same condition previously described.

When the detection result in step S248 represents negative ("NO" in step S248), i.e. represents that there is only one radar detection object which satisfies the same condition, the operation flow progresses to step S250.

In step S250, the ECU 40 sets the preceding vehicle flag of this radar detection object the value of 1 (i.e. the preceding vehicle flag=1).

On the other hand, when the detection result in step S248 represents positive ("YES" in step S248), i.e. represents that there are a plurality of radar detection objects which satisfy the same condition, the operation flow progresses to step S249.

In step S249, the ECU 40 detects whether the vehicle distance is a minimum value MIN.

When the detection result in step S249 represents positive ("YES" in step S249), i.e. represents that the vehicle distance is the minimum value MIN, the operation flow progresses to step S250.

In step S250, the ECU 40 sets the preceding vehicle flag of this radar detection object to the value of 1 (i.e. the preceding vehicle flag=1).

On the other hand, when the detection result in step S249 represents negative ("NO" in step S249), i.e. represents that the vehicle distance is not the minimum value MIN, the operation flow progresses to step S251.

In step S251, the ECU 40 sets the preceding vehicle flag of this radar detection object to the value of 0 (i.e. the preceding vehicle flag=0).

Further, when the detection result in step S246 represents negative ("NO" in step S246), i.e. represents that the current value of the own vehicle driving line probability Pr of the radar detection object is smaller than the predetermined threshold value Th1, the operation flow In step S251, the ECU 40 sets the preceding vehicle flag of this radar detection object to the value of 0 (i.e. the preceding vehicle flag=0).

S247 represents negative ("NO" in step S247), i.e. represents that the vehicle distance is larger than the predetermined vehicle distance threshold value Dsel, the operation flow progresses to step S251.

In step S251, as previously described, the ECU 40 sets the preceding vehicle flag of this radar detection object to the value of 1 (i.e. the preceding vehicle flag=1).

The operation flow returns from the preceding vehicle selection process shown in FIG. 8 to step S25 shown in FIG. 7.

In step S25 shown in FIG. 7, the ECU 40 detects there is a preceding vehicle. When the preceding vehicle flag has the value of 1, the ECU 40 detects that the preceding vehicle is present ("YES" in step S25), the operation flow progresses to step S26.

In step S26, the vehicle control device 60 adjusts the vehicle distance between the own vehicle and the preceding vehicle. That is, the vehicle control device 60 adjusts the vehicle speed of the own vehicle, for example performs the adaptive cruise control (ACC) so as to maintain the vehicle distance between the own vehicle and the preceding vehicle detected by the ECU 40 at the predetermined vehicle distance.

On the other hand, when the detection result represents negative ("NO" in step S25), i.e. represents that no preceding vehicle is present, the operation flow progresses to step S27.

In step S27, the ECU 40 detects whether the previously-detected preceding vehicle has been selected.

When the detection result represents positive ("YES" in step S27), i.e. represents that the previously-detected preceding vehicle has been selected, the operation flow progresses to step S28.

In step S28, the ECU 40 and the vehicle control device 60 perform the control process of adjusting the acceleration of the own vehicle. The operation flow progresses to step S29.

In step S29, the vehicle control device 60 performs a usual driving control of the own vehicle so that the own vehicle is running at a constant speed, for example.

On the other hand, when the detection result represents negative ("NO" in step S27), i.e. represents that the previously-detected preceding vehicle has not been selected, the operation flow progresses to step S29.

In step S29, as previously described, the vehicle control device 60 performs the usual driving control of the own vehicle so that the own vehicle is running at a constant speed, for example.

That is, when the detection result represents negative ("NO" in step S27), i.e. represents that the previously-detected preceding vehicle has not been selected, the vehicle control device 60 allows the own vehicle to accelerate or decelerate.

The vehicle control processes previously described will be explained in detail with reference to FIG. 4 and FIG. 10.

Figure 10:
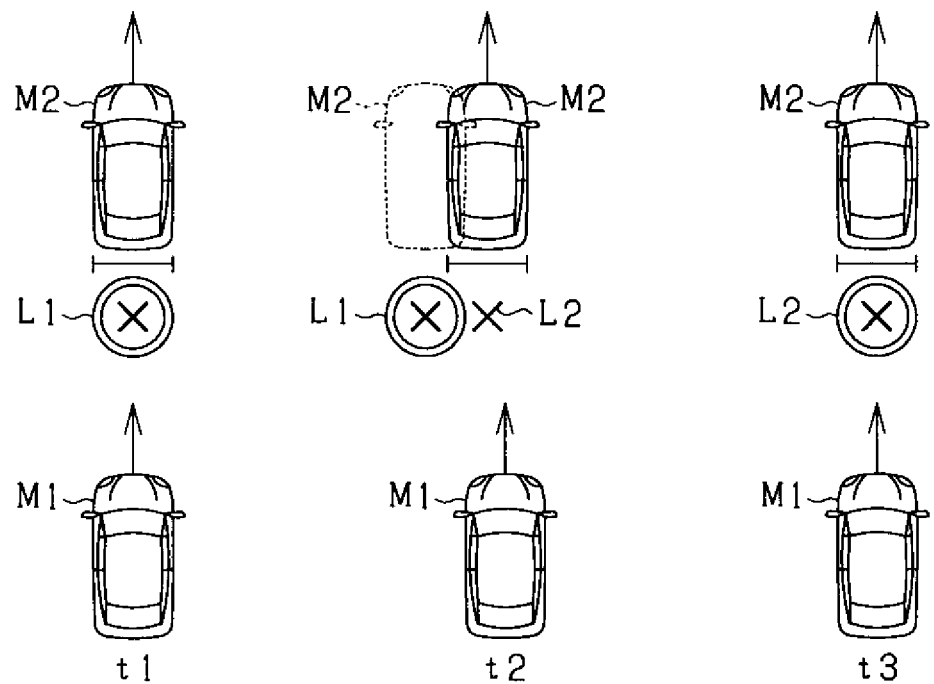
FIG. 10 is a view showing an example of an association process performed by the object detection device according to the exemplary embodiment of the present invention.

FIG. 10 is a view showing an example of the association process performed by the ECU 40 as the object detection device according to the exemplary embodiment of the present invention.

In FIG. 10, reference character M1 represents the own vehicle and reference character M2 represents the preceding vehicle which is running in front of the own vehicle on the own driving lane of the own vehicle.

At timing t1 shown in FIG. 4, the ECU 40 continuously and stably acquired the data of the preceding vehicle M2 on the basis of the first object L1 shown in FIG. 10. When the own vehicle driving line probability Pr1 of the first object L1 is greater than the predetermined threshold value Th1, the ECU 40 selects the preceding vehicle M2 as the preceding vehicle which is running in front of the own vehicle.

When the relative location (such as the vehicle distance and the location in the wide direction of the body of the vehicle) between the own vehicle M1 and the preceding vehicle M2 varies, the irregular detection occurs, in which the ECU 40 detects, as the preceding vehicle M2, a plurality of radar detection objects (for example, the first object L1 and the second object L2, at the center part of FIG. 10). The irregular detection has been previously explained.

After this, the ECU 40 gradually acquires unstable data of the first object L1, and gradually acquires the stable data of the second object L2. That is, after timing t2 shown in FIG. 4, the own vehicle driving line probability Pr1 of the first object L1 is gradually reduced, and the own vehicle driving line probability Pr2 of the second object L2 gradually increases.

In this situation, a conventional vehicle detection device cannot temporarily select the preceding vehicle M2 during the period Ta in which both the own vehicle driving line probability Pr1 of the first object L1 and the own vehicle driving line probability Pr2 of the second object L2 are less than the predetermined threshold value Th1.

On the other hand, the ECU 40 as the vehicle detection device according to the exemplary embodiment having the improved structure performs the association process previously described at the timing t2 when the irregular detection has occurred. That is, in the association process, the association processing part 45 in the ECU 40 determines the initial value of the own vehicle driving line probability Pr of the second object L2 on the basis of, i.e. by using the history data of the am own vehicle driving line probability Pr of the first object L1. In more detail, in the association process, the ECU 40 sets the initial value of the own vehicle driving line probability Pr2 of the second object L2 to the own vehicle driving line probability Pr1 of the first object L1.

Accordingly, because the initial value of the own vehicle driving line probability Pr2 of the second object L2 becomes more than the predetermined threshold value Th1, the same object is selected as the preceding vehicle on the basis of the second object L2. After timing t3 (see FIG. 4), even if the own vehicle driving line probability Pr1 of the first object L1 becomes less than the predetermined threshold value Th1, the ECU 40 continuously selects the preceding vehicle M2 on the basis of the second object L2 unless continuously and stably acquiring data of the second object L2.

The object detection device according to the exemplary embodiment of the present invention has the following superior effects (1) to (14).

(1) In an object selected as a preceding vehicle, the irregular detection has occurred, in which the first object L1 which has been used to select the preceding vehicle and the second object L2 which has not been used to select the preceding vehicle are recognized from the object, there is a possible case in which the ECU 40 does not detect the first object L1 and cannot select, as the preceding vehicle, the object recognized by using the first object L1.

On the other hand, even if the irregular detection has occurred, it is possible for the ECU 40 to correctly detect, as the preceding vehicle, the object detected on the basis of the second object L2 unless the second object L2 is continuously detected after the irregular detection has occurred. However, when the ECU 40 cannot select, as the preceding vehicle, the object detected on the basis of the first object L1 until the ECU 40 detects, as the preceding vehicle, the object on the basis of the second object L2, the ECU 40 temporarily misses the presence of the object as the preceding vehicle.

In order to eliminate this drawback, when the irregular detection occurs, the ECU 40 as the object detection device according to the exemplary embodiment performs the association process previously described. Even if the irregular detection occurs, the association process makes it possible to correctly and continuously select the object, as the preceding vehicle, without missing the preceding vehicle, on the basis of the second object L2 which receives the history data of the first object L1. That is, the ECU 40 can continuously and correctly select the preceding vehicle without missing the preceding vehicle.

Further, the ECU 40 as the object detection device according to the exemplary embodiment performs both the irregular detection occurrence detection process and the association process only for objects which have been selected as the preceding vehicle, it is possible to reduce the calculation load of the ECU 40 when compared with a case in which the ECU 40 performs both the irregular detection occurrence detection process and the association process for all objects which have been recognized.

(2) In the second angle area (wide-angle radar scanning area Δθ1) in the predetermined area around the own vehicle, which is wider than the predetermined angle area corresponding to the reference X1 which has been determined in front of the location of the own vehicle, the irregular detection easily occurs when compared with the first angle area which is smaller than the predetermined angle to the reference axis X1. Accordingly, the ECU 40 as the object detection device according to the exemplary embodiment selects, as the preceding vehicle, an object having a length which is less than the first vehicle distance A1 in the first angle area, and the ECU 40 selects, as the preceding vehicle, the object having a length which is less than the second vehicle distance A2 in the second angle area. The second vehicle distance A2 is smaller than the first vehicle distance A1.

This control process makes it possible to more select, as the preceding vehicle, the object recognized in the first angle area more than the object recognized in the second angle area. This makes it possible to suppress occurrence of the irregular detection in the object selected as the preceding vehicle.

(3) In general, the irregular detection easily occurs in a wide angle area which is determined from, i.e. viewed from the reference axis X1 in front of the location of the own vehicle. In order to avoid this, the ECU 40 as the object detection device according to the exemplary embodiment does not select, as the preceding vehicle, the detection target object recognized in a wide angle area (which corresponds to the wide-angle radar scanning area Δθ1) which is wider than the predetermined angle viewed from the reference axis X1 which has been determined in front of the location of the own vehicle. This control process makes it possible to suppress the occurrence of the irregular detection of the object selected as the preceding vehicle.

(4) When there are a plurality of objects which satisfy the predetermined condition of the relationship with the own vehicle, the ECU 40 as the object detection device according to the exemplary embodiment selects, as the preceding vehicle, the object having a shortest vehicle distance. Accordingly, it is possible to correctly select the object as the preceding vehicle on the basis of the magnitude of the vehicle distance between the own vehicle and the object.

(5) When the first object L1 and the second object L2 correspond to the same image object, the ECU 40 as the object detection device according to the exemplary embodiment determines that the irregular detection of the same detection target object has occurred. It is accordingly possible to increase the detection accuracy when the ECU 40 as the object detection device detects occurrence of the irregular detection.

(6) Because the preceding vehicle is selected only when the radar detection object and the image object have been acquired from the object, it is possible for the ECU 40 as the object detection device to more correctly select the object as the preceding vehicle. Further, it is possible for the ECU 40 to smoothly and correctly perform the association process when the preceding vehicle is the detection target object and the irregular detection has occurred.

(7) When the second object L2 associates, i.e. updates history data of the own vehicle driving line probability Pr to data of the second object L2 instead of data of the first object L1 which has previously been used in the selection of the preceding vehicle, the initial value of the own vehicle driving line probability Pr of the second object L2 becomes a high value which is adequately selectable in the selection of the preceding vehicle. Accordingly, this association process makes it possible for the ECU 40 to immediately select the object as the preceding vehicle on the basis of the second object L2. Accordingly, even if the irregular detection occurs, it is possible for the ECU 40 to correctly select, as the preceding vehicle, one of the first object L1 and the second object L2 without missing the preceding vehicle.

(8) An unstable detection state of an object easily occurs in the second angle area which is larger than the predetermined angle area in the predetermined recognition area to be used for recognizing the presence of the object around the own vehicle. Accordingly, in the area having the first angle which is smaller than the predetermined angle to the reference axis X1 in the forward direction of the own vehicle, the object having the vehicle distance measured from the own vehicle (which is smaller than the first vehicle distance) is selected as the preceding vehicle. On the other hand, in the area having the second angle which is larger than the first vehicle distance, the object having the vehicle distance measured from the own vehicle (which is smaller than the second vehicle distance which is further smaller than the first vehicle distance) is selected as the preceding vehicle. This control process makes it possible to suppress generation of the unstable detection state of the object.

(9) When the own vehicle is in a right turn or a left turn, for example at an intersection on the own driving lane, the probability for the wide-angle radar scanning area $\Delta\theta1$, which is larger than the predetermined angle to the reference axis X1, to be on the own vehicle driving line (on the estimated own vehicle driving path) becomes high.

In this case, the probability of the ECU 40 selecting the detection target object detected within the wide-angle radar scanning area $\Delta\theta1$ of the radar device 20 becomes high. Accordingly, when the own vehicle makes a left turn or a right turn, the ECU 40 as the object detection device according to the exemplary embodiment selects, as the preceding vehicle, the object having the vehicle distance which is less than the second vehicle distance (which is greater than the first vehicle distance) within the second area having the angle (which is wider than the predetermined angle) to the reference axis X1. This control process makes it possible to suppress the occurrence of an unstable state of the selection of the preceding vehicle.

(10) There is a tendency for the unstable state to easily occur in the area having the angle which is greater than the predetermine dangle so as to recognize the object. The ECU 40 as the object detection device according to the exemplary embodiment does not select the detection target object recognized in the area having the scanning angle which is wider than the predetermined scanning angle of the radar device 20. This control process makes it possible to suppress the unstable selection of the detection target object as the preceding vehicle.

(11) When the own vehicle makes a right turn or a left turn, the probability becomes high in which the area having the angle to the reference axis X1 is wider than the predetermined angle is present on the own vehicle driving line (on the estimated own vehicle driving path). In this case, the ECU 40 as the object detection device according to the exemplary embodiment selects, as the preceding vehicle, the detection target object detected in this area with a high probability. Accordingly, when the own vehicle makes a right turn or a left turn, the ECU 40 does not select the object detected in this area as the preceding vehicle. This control process makes it possible to suppress the occurrence of instability in the selection of the selection of the preceding vehicle.

(12) Because the ECU 40 as the object detection device according to the exemplary embodiment does not perform the association process of the object which is not selected as the preceding vehicle even if the irregular detection has occurred, this makes it possible to reduce the calculation load of the ECU 40.

(13) The ECU 40 selects the object as the preceding vehicle when the object has the vehicle distance which is less than the first vehicle distance A1, not less than the second vehicle distance A2 even if the object is recognized within the second angle area (i.e. within the wide-angle radar scanning area $\Delta\theta1$). As previously described, it is possible for the ECU 40 as the object detection device according to the exemplary embodiment to stably select the object which has been selected as the preceding vehicle.

(14) When it becomes difficult to select the object as the preceding vehicle due to occurrence of the irregular detection, and to accelerate the own vehicle, there may occurs an inconvenience case, for example, a dangerous case in which the own vehicle rapidly approaches the preceding vehicle. In order to avoid this, the ECU 40 as the object detection device according to the exemplary embodiment limits the acceleration of the own vehicle when the object as the preceding vehicle is not selected and the irregular detection occurs during the detection process of the object. This control makes it possible to avoid the occurrence of such a dangerous case in which the own vehicle rapidly approaches the preceding vehicle.

The concept of the object detection device according to the present invention is not limited by the disclosure of the exemplary embodiment previously described. It is possible for the present invention to have the following modifications of the exemplary embodiment.

The same components between the following modifications (M1) to (M13) and the exemplary embodiment will be referred to with the same reference numbers and characters, and the explanation of the same components is omitted for brevity. As previously described, the ECU 40 as the object detection device provides the various functions such as the detection target object recognition part 41, the own vehicle driving line probability calculation part 42, the preceding vehicle selection part 43, the irregular-detection detecting part 44 and the association processing part 45, as previously described.

(M1) There may occur a possible case in which a deviation in location between the first object L1 and the second object L2 increases with the elapsed of time after the irregular detection occurred. In order to avoid this, it is preferable for the association processing part 45 to perform the association process within a predetermined time or within a predetermined period counted from the time when the irregular-detection detecting part 44 has detected the occurrence of the irregular detection.

For example, it is possible for the ECU 40 to determine the predetermined period on the basis of an experimentally-obtained period so that the distance between the first object L1 and the second object L2 does not exceed the body width of the own vehicle.

It is more preferable for the association processing part 45 to perform the association process at the timing when (or in a period in which) the irregular-detection detecting part 44 detects occurrence of the irregular detection. This control makes it possible to suppress the accuracy of the vehicle control from being reduced, and to correctly perform the association process.

(M2) The ECU 40 reduces a selection probability of an object to be selected as the preceding vehicle, when the object has been detected within the wide-angle radar scanning area $\Delta\theta 1$, during a right turn or a left turn of the own vehicle. It is further acceptable to reduce the selection probability of the object as the preceding vehicle, when the object has been detected within the wide-angle radar scanning area $\Delta\theta 1$, regardless of the right turn or the left turn of the own vehicle. That is, it is acceptable for the ECU 40 to eliminate the process in the step S241 in the preceding vehicle selection process shown in FIG. 8.

(M3) There is a possible case in which each radar-detection object recognized based on each radar-detection object satisfies the selection condition to be used for selecting the preceding vehicle when the first object L1 and the second object L2 are continuously detected after the association process has finished. That is, it may occur that the own vehicle driving line probability Pr of each of the first object L1 and the second object L2 becomes not less than the predetermined threshold value Th1, and the vehicle distance between each of the first object L1 and the second object L2 becomes less than the predetermined vehicle distance threshold value.

In this case, when there is no difference between the first distance and the second distance, there may occur a possible case in which the detection target object recognized by the first object L1 and the detection target object recognized by the second object L2 are alternately selected as the preceding vehicle, where the first distance represents a distance between the first object L1 and the own vehicle, and the second distance represents a distance between the second object L2 and the own vehicle. This situation introduces unstable vehicle control.

In order to avoid this, it is possible for the preceding vehicle selection part 43 to increase the second vehicle distance between the second object L2 and the own vehicle because the previously-performed preceding vehicle selection process has not used the second object L2. For example, the preceding vehicle selection part 43 adds a correction vehicle distance $\Delta A$ into the second vehicle distance A between the detection target object recognized by the second object L2 and the own vehicle, or multiplies the second vehicle distance A with a predetermined coefficient $\alpha$ (>1, i.e. which is more than 1).

This correction process makes it possible to reduce the preceding vehicle selection probability of the second object L2 as the preceding vehicle. That is, this correction process makes it more difficult for the second object L2 to be selected as the preceding vehicle during the current preceding vehicle selection process in addition to the previously-performed preceding vehicle selection process.

Because the first object L1 is switched to the second object L2 in the association process performed after the preceding vehicle selection process, this control makes it possible to suppress the vehicle control of the own vehicle from being unstable when the own vehicle follows the preceding vehicle.

When the increased second vehicle distance becomes less than the predetermined vehicle distance, it is preferable to prohibit the correction process from being performed, where as previously described, the correction process increases the second vehicle distance between the object recognized by using the second object L2 and the own vehicle.

That is, even if the correction process has been applied to the second object L2 which has not being used for selecting the preceding vehicle, when the object recognized by using the second object L2, adequately approaches the own vehicle, the preceding vehicle selection part 43 in the ECU 40 finishes the correction process. This control makes it possible to allow the preceding vehicle selection part 43 to select the object as the preceding vehicle on the basis of the second object L2 when the object recognized on the basis of the second object L2 adequately approaches the own vehicle. This control makes it possible to correctly detect the preceding vehicle on the basis of the radar detection object, closest to the own vehicle, acquired by the radar device 20.

(M4) In the preceding vehicle selection process performed by the ECU 40 as the object detection device according to the exemplary embodiment previously described, it becomes hard to select, as the preceding vehicle, the object recognized within the wide-angle radar scanning area $\Delta\theta 1$ in the radar detection object data acquiring range $\theta 1$. However, the concept of the present invention is not limited by this control process. That is, it is possible to eliminate this control process, and acceptable to perform the preceding vehicle selection process regardless of the magnitude of the radar scanning area in which the object is acquired.

That is, it is also acceptable for the object detection device to perform the preceding vehicle selection process for all acquired objects by using a constant value as the vehicle distance threshold value Dsel regardless of the magnitude of the radar scanning angle.

(M5) In the preceding vehicle selection process performed by the ECU 40 as the object detection device according to the exemplary embodiment previously described, it is possible not to eliminate, from the selection of the preceding vehicle, the object recognized on the basis of the radar detection object acquired within the wide-angle radar scanning area $\Delta\theta 1$ of the radar device 20. For example, in step S244 shown in FIG. 8, the own vehicle driving line probability Pr1 of the first object L1 is set to the second vehicle distance threshold value Dsel2 of zero (Dsel2=0) used in the wide-angle radar scanning area Δθ1. Instead of this, it is acceptable to add a detection condition to determine whether the radar detection object is acquired within the wide-angle radar scanning area Δθ1. When the detection result represents that the radar detection object is acquired within the wide-angle radar scanning area Δθ1, the operation flow progresses to step S251 shown in FIG. 8. In step S251, the preceding vehicle flag is set to the value of 0. This control makes it possible to suppress occurrence of the irregular detection of the object selected as the preceding vehicle.

(M6) In the association process performed by the ECU 40 as the object detection device according to the exemplary embodiment previously described, it is possible for the association processing part 45 to prohibit the continuous execution of the association process until a predetermined elapsed time counted from the timing when the previous continuous processing has finished is elapsed. That is, when the association process is repeated immediately after the irregular detection has occurred and the previous association process has been finished, there is a possible case in which the unstable selection of the preceding vehicle occurs. Accordingly, the association processing part 45 prohibits the continuous execution of the association process until the predetermined period of time, counted when the irregular detection occurs, and the association process is finished, is elapsed. This control makes it possible to suppress the preceding vehicle selection process from being unstably performed due to the repetition of the association process.

(M7) In the association process performed by the ECU 40 as the object detection device according to the exemplary embodiment previously described, it is acceptable for the association processing part 45 to perform the association process for all detection target objects (i.e. preceding vehicle selection candidates) having the own vehicle driving line probability Pr of more than the predetermined threshold value Th1 and having the selection possibility as the preceding vehicle.

In this case, because the association processing part 45 does not perform the association process of a detection target object which is not the preceding vehicle selection candidates, this control makes it possible to reduce the calculation load of the ECU 40 as the object detection device, and to correctly select the detection target objects as the preceding vehicle.

(M8) In the structure of the object detection system shown in FIG. 1, the radar device 20 provides the functions of the radar detection object acquiring part and the object recognition part. However, the concept of the present invention is not limited to this structure. It is possible and acceptable for the ECU 40 to provide the functions of the radar detection object acquiring part and the object recognition part. Further, in the structure of the object detection system shown in FIG. 1, the vehicle control device 60 provides the function of the vehicle speed control part. However, it is acceptable for the ECU 40 to provide the function of the vehicle speed control part instead of the vehicle control device 60.

(M9) In the structure of the object detection system shown in FIG. 1, it is sufficient to have a structure in which the object detection device is connected to the radar device 20, and not connected to the image acquisition device 30. In this structure, it is possible to eliminate the processes in step S21 and step S22 shown in FIG. 7, and to select the detection target object as the preceding vehicle on the basis of the data regarding the radar detection objects transmitted from the transmitter 21 of the radar device 20. For example, it is sufficient to select, as the preceding vehicle, the object which is continuously detected as the am detection target object (during a predetermined period of time) by the radar device 20.

(M10) As previously described, the exemplary embodiment of the object detection device has shown the association process of associating, i.e. updating the own vehicle driving line probability of the object. However, the concept of the present invention is not limited to this structure. It is acceptable to perform the association process of associating a history data of the vehicle distance between the object and the own vehicle. In this case, when there is a deviation between the vehicle distance between the first object L1 and the own vehicle and the vehicle distance between the second object L2 and the own vehicle, it is possible to suppress the influence due to this deviation. Further, it is acceptable to associate the history data regarding the moving direction of the object with the moving direction of the own vehicle, a relative speed between the own vehicle and the object, etc.

(M11) In the exemplary embodiment previously described, the ECU 40 selects the object as the preceding vehicle by using the own vehicle driving line probability Pr and the vehicle distance between the object and the own vehicle as the parameters. However, the concept of the present invention is not limited to this structure. It is sufficient to use the image object acquired from the forward view image transmitted from the image acquisition device 30 so as to select the object as the preceding vehicle. That is, it is acceptable to detect the vehicle distance between the object and the own vehicle on the basis of the image object. Further, it is acceptable to select, as the preceding vehicle, the object which satisfies the predetermined conditions.

(M12) It is possible for the irregular-detection detecting part 44 to detect occurrence of the irregular detection when the radar detection am object is collated with image objects acquired from the forward view image, and the detection target object selected as the preceding vehicle corresponds to a plurality of the radar detection objects.

(M13) It is acceptable to mount the radar device 20 on at least the front end part of the own vehicle, on a vehicle side part of the own vehicle, or on a rear end side of the own vehicle. That is, it is acceptable to determine the radar detection object data acquiring range θ1 around the own vehicle or at a rear side or a body side of the own vehicle.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An object detection device to be mounted on an own vehicle equipped with a radar detection object acquiring part and an object recognition part, the radar detection object acquiring part acquiring, as a radar detection object, an object present within a predetermined area around the own vehicle, and the object recognition part recognizing the object in time series on the basis of the radar detection object acquired by the radar detection object acquiring part, the object detection device comprising a computer system including a central processing unit, the computer system being configured to provide:
  a preceding vehicle selection part that selects the object as
    a preceding vehicle which is running in front of the own vehicle when the object recognition part recognizes, as the preceding vehicle, the object when a relationship between the object and the own vehicle satisfies a predetermined condition;

an irregular-detection detecting part that detects occurrence of an irregular detection of the object selected as the preceding vehicle, in which (i) a first radar detection object and a second radar detection object are both recognized as being the object selected as the preceding vehicle, (ii) the first radar detection object is used for selecting the object as the preceding vehicle, and (iii) the second radar detection object is not used for selecting the object as the preceding vehicle; and an association processing part that performs an association process of associating history data of the first radar detection object with the second radar detection object when the irregular detection has occurred such that a reliability of an own vehicle driving line probability of the object that is calculated on the basis of the first radar detection object is maintained while the preceding vehicle selection part uses the first radar detection object for selecting the object as the preceding vehicle.

2. The objection detection device according to claim 1, wherein the preceding vehicle selection part selects the object as the preceding vehicle when the predetermined condition is satisfied, the predetermined condition being that a vehicle distance between the radar detection object recognized by the object recognition part is less than a predetermined vehicle distance, and the preceding vehicle selection part selects the object as the preceding vehicle when the vehicle distance is less than a first vehicle distance in a first area in the predetermined area, and selects the object as the preceding vehicle when the vehicle distance is less than a second vehicle distance in a second area in the predetermined area, wherein the second vehicle distance is less than the first vehicle distance, the first area and the second area in the predetermined area are measured relative to a reference axis determined in front of a location of the own vehicle, the first area has a first radar scanning angle which is less than a predetermined radar scanning angle, and the second area has a second radar scanning angle which is more than the predetermined radar scanning angle.

3. The objection detection device according to claim 2, wherein the preceding vehicle selection part selects the object as the preceding vehicle even if the vehicle distance is less than the first vehicle distance in the second area when the object has been selected as the preceding vehicle.

4. The objection detection device according to claim 1, wherein the preceding vehicle selection part excludes the object from the selection of the preceding vehicle when the object has been recognized within an area, a radar scanning angle of which is greater than the predetermined radar scanning angle measured relative to a reference axis determined in front of a location of the own vehicle.

5. The objection detection device according to claim 1, wherein the association processing part performs the association process within a predetermined period of time counted from a timing when the irregular-detection detecting part detects occurrence of the irregular detection.

6. The objection detection device according to claim 1, wherein the association processing part waits to perform the association process again until a predetermined period of time is elapsed after the association process was previously performed.

7. The objection detection device according to claim 1, wherein the preceding vehicle selection part selects the object having a minimum vehicle distance in a plurality of objects when the object recognition part has recognized the plurality of objects.

8. The objection detection device according to claim 7, wherein the preceding vehicle selection part selects the object as the preceding vehicle when the vehicle distance between the own vehicle and the radar detection object recognized by the object recognition part is less than a predetermined vehicle distance, and the object recognition part adds a correction value to the vehicle distance between the object as a second object and the own vehicle when the irregular detection has occurred.

9. The objection detection device according to claim 1, further comprising an image object acquiring part acquiring an image object, which corresponds to the object from an acquired image obtained in an image acquisition area which corresponds to the predetermined area, wherein the irregular-detection detecting part detects occurrence of the irregular detection when a first object and a second object correspond to a same object.

10. The objection detection device according to claim 9, further comprising a detection target object recognition part which recognizes, as the detection target object, an object which has been acquired from the radar detection object and the image object, wherein the preceding vehicle selection part selects the object as the preceding vehicle when the object has been recognized as the detection target object.

11. The objection detection device according to claim 1, further comprising an own vehicle driving line probability calculation part calculating the own vehicle driving line probability of the object on the basis of the radar detection object, wherein the preceding vehicle selection part selects the object as the preceding vehicle when the own vehicle driving line probability of the object is higher than a predetermined threshold value of the own vehicle driving line probability, and the association processing part performs the association process of associating history data of the own vehicle driving line probability of a first object with a second object.

12. The objection detection device according to claim 1, wherein the association processing part does not perform the association process for the object which has not been selected as the preceding vehicle.

13. A vehicle control system comprising:

the object detection device according to claim 1; and a vehicle speed control part adjusting a vehicle speed of the own vehicle so as to maintain, at a predetermined vehicle distance, a vehicle distance between the own vehicle and the object selected by the preceding vehicle selection part in the object detection device, and the vehicle speed control part accelerating and decelerating the own vehicle when the preceding vehicle selection part does not select the object as the preceding vehicle, wherein the vehicle speed control part limits the acceleration of the own vehicle when the irregular detection occurs in the object selected as the preceding vehicle and the preceding vehicle selection part has not selected the object as the preceding vehicle.

* * * * *